UNITED STATES PATENT OFFICE.

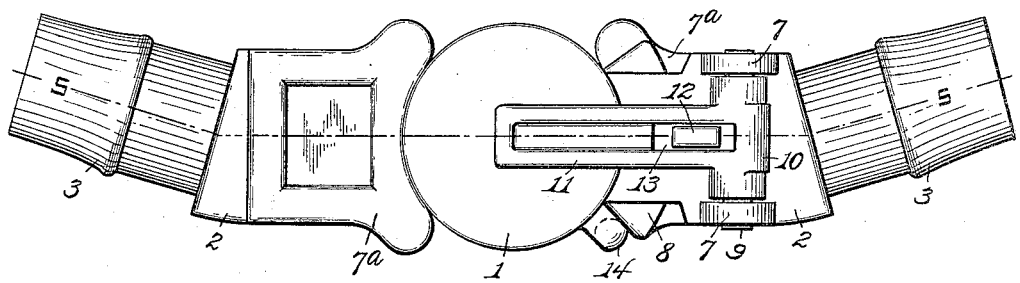
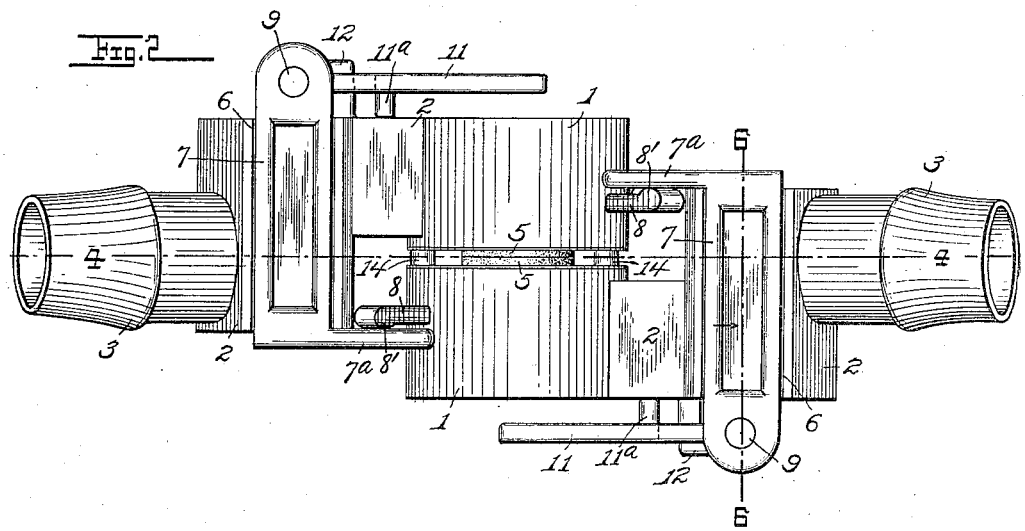
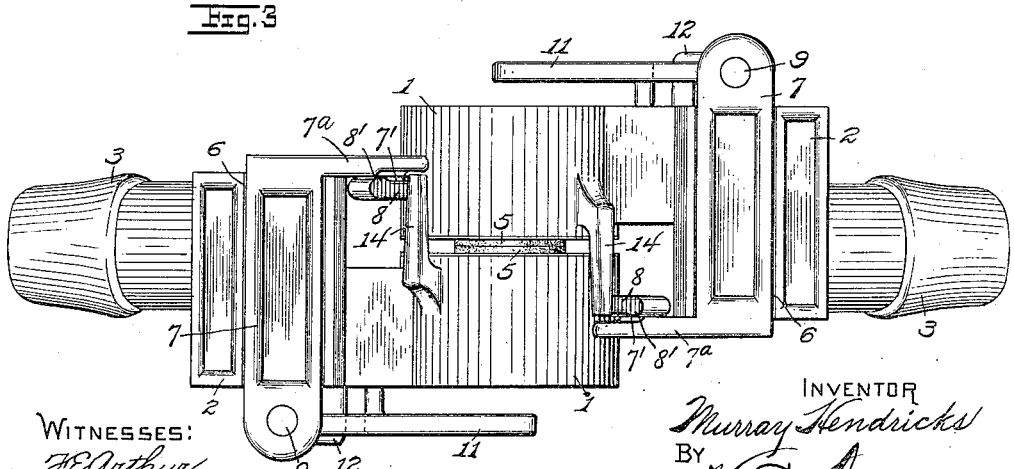

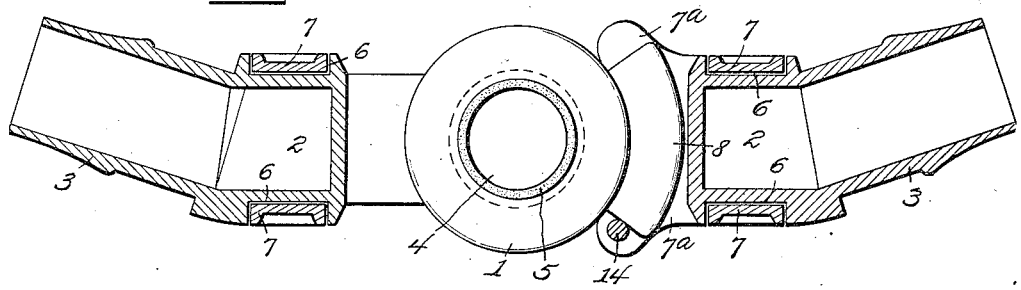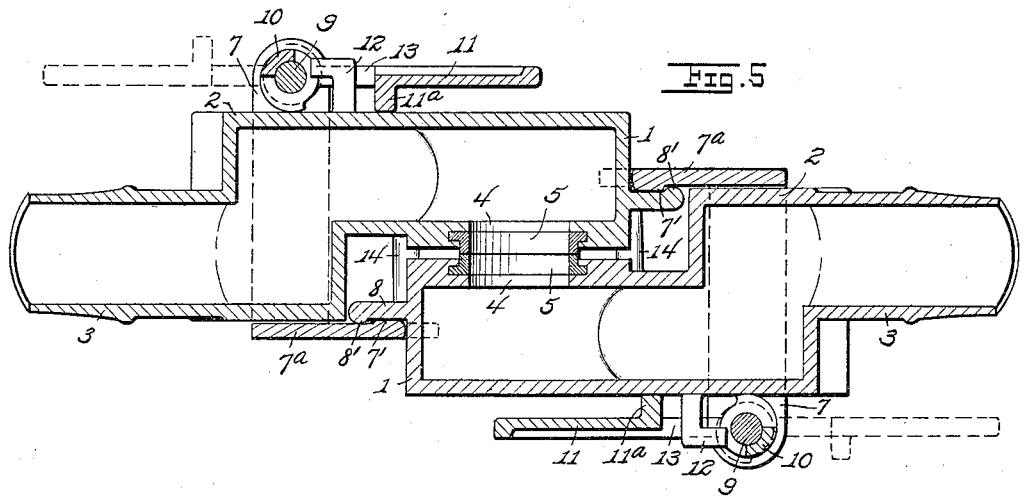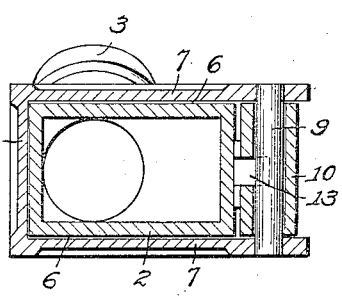

MURRAY HENDRICKS, OF BENWOOD, WEST VIRGINIA.

AIR-HOSE COUPLING.

1,033,890.  Specification of Letters Patent.  Patented July 30, 1912.

Application filed May 29, 1911. Serial No. 630,164.

*To all whom it may concern:*

Be it known that I, MURRAY HENDRICKS, a citizen of the United States of America, and resident of Benwood, county of Marshall, and State of West Virginia, have invented certain new and useful Improvements in Air-Hose Couplings, of which the following is a specification.

This invention relates broadly to hose couplings, and specifically to couplings for the air-hose of train air brake systems.

The primary object of the invention is to provide a hose-coupling the interlocking members of which have associated therewith simple and efficient means whereby they may be conveniently adjusted with relation to each other for compressing the gaskets or flexible packing rings to compensate for wear in the latter, thereby maintaining a tight joint.

A further object is to provide a coupling of the character mentioned which, while embodying means for tightly compressing the gaskets of the coupler members when in interlocking or operative engagement, admits of expeditious and easy coupling and uncoupling.

A further object within the contemplation of this invention is to provide a coupler member which will interfit with the common or standard type of coupler head now ordinarily employed, and which, when used in connection with the latter, is adjustable precisely as when used with one of its own type.

Other objects will in part be apparent and in part pointed out hereinafter.

The invention accordingly consists in the features of construction, combinations of elements and arrangement of parts which will be exemplified in the construction hereinafter set forth, reference being had to the accompanying drawings, forming a part of this specification, in which—

Figure 1 is a side elevation of two coupler members embodying my invention, the same being shown coupled in operative position with the compressing lever disposed in operative clamping position; Fig. 2 is a top plan view of the same; Fig. 3 is a bottom plan view of the same; Fig. 4 is a longitudinal section on the line 4—4, Fig. 2; Fig. 5 is a similar section on the line 5—5, Fig. 1; and Fig. 6 is a transverse section on the line 6—6, Fig. 2.

In said drawings, like designating characters distinguish like parts throughout the several views.

Since the coupling consists of two precisely similar coupler members, the description of the structural features applies equally to both.

Each member consists of a substantially cylindrical hollow casing or head 1 which communicates through the peripheral wall thereof with the interior of a substantially L-shaped box or shell 2 from which leads the hollow shank or thimble 3 upon which is received the end of the usual rubber hose attached to the train-line air-pipe; said head, box and thimble being preferably cast in a single piece. When the coupler members are connected in operative relation, communication is had between the two heads 1 through registering axially-disposed openings 4 provided in the adjacent inner flat faces thereof. A suitable gasket 5, preferably of rubber, is appropriately seated in each head about the opening 4 so as to project outward beyond the said inner face, provision being thus made for forming a tight joint when the two heads are coupled together.

In the couplings ordinarily employed, the means whereby the heads are interlocked are formed integral with, or are rigidly fixed to, said heads. With such construction, when the gaskets become worn or defective, leakage occurs at the joint, and, in order to tighten or render the latter effective, various expedients are resorted to by the trainmen, such, for instance, as driving nails or other wedging objects between the interlocking portions of the heads or members. While this is usually effective, it is frequently disastrous to the coupling, rupturing parts which are vital to its efficiency; further, this expedient so binds the parts as to render uncoupling extremely difficult. With the application of excessive force for effecting uncoupling of such wedged heads, the coupling is further subjected to undue strains, oftentimes resulting in breakage.

To obviate the objection above noted as existing in the usual type of coupling, I provide adjustable interlocking means whereby the coupler members may be conveniently adjusted with relation to each other to any extent which the condition of the gaskets may warrant for producing an air-tight joint.

Provided in the parallel top and bottom faces of the box or shell 2 are two transverse channels or guide-ways 6 in which are slidably mounted the opposite parallel members 7 of a one-piece clevis-shaped yoke which has its cross base member projected forward to form a shoulder or extension 7ª which lies parallel to and at a distance from the inner apertured face of the cylindrical head 1, the front end of said extension being of arcuate form adapted for receiving thereagainst in abutting relation the peripheral end or edge of the opposite head 1. Said extensions thus constitute gages or stops whereby the heads are accurately positioned with relation to each other for effecting proper registration of the axial openings 4. Carried in fixed relation to, or integral with, the head 1 on its said peripheral end or edge is a fan-shaped flange 8 adapted to assume binding underlying engagement with the extension 7ª of the opposite coupler member when the two heads are coupled together, the flanges and extensions interlocking, as shown in Figs. 2, 3 and 5, for preventing separation of the heads due to the axially directed force of the air passing through them.

The free ends of the members 7 of the yoke project outward beyond the outer face of the box or shell 2, which face is preferably flush with the outer face of the head 1, and have fixed therein the opposite ends of a vertically disposed pintle 9 upon which is rotatably mounted a cam-faced sleeve 10 having an integral lever 11 by means of which said sleeve may be rotated. As will be apparent, when said lever occupies the position indicated by dotted lines in Fig. 5, the yoke has a limited range of free movement in a transverse direction with the members 7 slidable in the channels 6. Thus, during the coupling operation, the extension 7ª of one coupler member occupies a position which readily permits of the reception of the flange 8 of the other member in underlying interlocking relation thereto with the application of but little gasket-compressing force. Then, when coupled, the gaskets are tightly compressed against each other by turning the lever 11 toward the position shown in full lines in said figure, said action rotating the sleeve 10 in such manner as to cause its cam-face to exert a force between the coupler member and its yoke for drawing the coupled heads, through the intermediacy of the interlocked flange and extension, into gasket-compressing relation. In other words, when the opposite sleeves are rotated forward, the extensions 7ª carried by the yokes of the opposing coupler members are drawn inward, and, each extension bearing upon the flange 8 of the opposite member, forces the latter inward, causing the opposing inner faces to approach each other and to thus compress the gaskets, one against the other, into joint sealing relation.

Since the force exerted by the air upon the coupler heads is almost wholly lateral—that is, axially directed—there is but little tendency upon the part of the heads to draw apart in a longitudinal direction, and under ordinary conditions the frictional engagement of the opposing flanges and extensions, supplemented by that of the engaging gaskets, would suffice to prevent such longitudinal movement. However, beads 7' and 8', of but slight elevation are preferably formed on the adjacent faces of the extensions 7ª and flanges 8, respectively, near their terminal edges, said beads being adapted to interlock one with the other for lessening the chance of longitudinal separation of the coupler members. Should an accidental parting of a train occur, the beads will not, owing to their slight elevation, offer such resistance to parting of the coupler members as will result in breakage of, or other injury to, the parts. A foot 11ª is preferably provided on that face of the lever which approaches the face of the cylindrical head 1, for preventing said lever from approaching said face so closely as to render difficult the grasping thereof when it is desired to swing it back, as in uncoupling.

Means is preferably provided whereby breakage of the lever 11 from a downwardly directed blow is guarded against, the means herein exemplified consisting of an L-shaped guard 12 formed on the outer face of the box 2 in front of the sleeve 10 and having its terminal end received in a slot 13 provided in said lever, said slot extending into and partially around the sleeve, as is clearly shown in Fig. 5.

When the heads are coupled together, the coupling assumes a pendent position, as is most clearly shown in Fig. 1, the thimbles 3 being inclined upward at an angle to the longitudinal axis of the coupling so as to allow the hose sections leading thereto to assume a natural inclined position, as ordinarily. For supporting the coupler members in proper alinement, an arm 14 is positioned on the under side of each head to be engaged by the lower edge of the flange 8 of the opposite coupler head, as is best shown in Figs. 3 and 4.

To uncouple the coupler members, the levers 11 are turned back to substantially the positions indicated in dotted lines in Fig. 5, thus relieving the pressure upon the gaskets, whereupon the members may be separated in the ordinary manner. The coupling operation is performed by bringing the heads into close proximity by vertical movement of the same with respect to each other, as ordinarily, and at the same time causing the heads to assume a substantially right angle with relation to each other, entering the lower edges of the flanges 8 behind the upper edges of the extensions 7ª, and then rotating the heads to the extended position most clearly shown in Figs. 1 and 4. The levers 11 are then swung around and inward toward the cylindrical heads 1 to apply gasket-compressing force.

Having thus described my invention, what I claim as new, and desire to secure by Letters Patent, is—

1. A hose coupling comprising two similar coupler members having heads movable axially with relation to each other, each head having a side axial port through which communication is had with the opposite head, an end flange carried by each head, an adjustable yoke mounted at the rear of each head and having an extension which parallels the inner face of the head and lies in binding engagement with the flange of the opposite head when coupled, and means for adjusting said yoke to cause its extension to exert pressure on said flange.

2. A hose coupling comprising two similar coupler members having heads with side ports and gaskets, each head having a fixed outer end flange, and a compressing device comprising a yoke slidably mounted behind said head and having an extension which parallels the apertured face of the head, said extension being adapted to interlock with the flange of the opposite head, and manually operated means for adjusting said yoke to cause its extension to exert inwardly-directed force upon said flange for compressing said gaskets.

3. A hose coupling comprising two similar coupler members having substantially cylindrical heads with side ports and gaskets, each head having a fixed outer end flange, and a compressing device comprising a yoke slidably mounted behind said head and having an arcuate extension which parallels the apertured face of the head, said extension being adapted to abut against the opposite head and to interlock with the flange of said head, and manually actuated means for moving said yoke to reciprocate the extension of the yoke behind the flange for compressing the gaskets.

4. A hose coupling comprising two similar coupler members having heads with side ports and gaskets, each head having a fixed outer end flange, and a compressing device comprising a yoke slidably mounted behind said head and having an extension which parallels the apertured face of the head, said extension being adapted to abut against the opposite head and to interlock with the flange of said head, and manually actuated means for moving the yoke to cause its extension to exert gasket-compressing force against the engaging flange.

5. A hose coupling comprising two similar coupler members having heads with side ports and gaskets, a yoke slidable transversely at the rear of said head and having an extension for abutting engagement with the opposite head, and means for moving said yoke to cause its extension to exert inwardly directed force upon the last mentioned head.

6. A hose coupling comprising two similar coupler members having heads with side ports and gaskets, a yoke slidable transversely at the rear of said head and having an extension for abutting engagement with the opposite head and permitting partial rotary movement of said members with respect to each other, and pivoted cam-like means arranged to draw upon the yoke for clamping the last-mentioned head firmly against the first mentioned head.

7. A hose coupling comprising two similar coupler members having heads with side ports and gaskets, a yoke slidable transversely at the rear of said head and having an arcuate extension for abutting movement-limiting engagement with the opposite head, a cam-like sleeve pivoted to said yoke, and a lever for rotating said sleeve to cause such movement of the yoke and its extension as will cause the latter to exert inwardly directed pressure upon the last mentioned head.

In testimony whereof I affix my signature in presence of two subscribing witnesses.

MURRAY HENDRICKS.

Witnesses:
H. E. DUNLAP,
BRUCE MORRIS.

Copies of this patent may be obtained for five cents each, by addressing the "Commissioner of Patents, Washington, D. C."